(12) United States Patent  
Schneider et al.

(10) Patent No.: US 10,310,833 B2  
(45) Date of Patent: Jun. 4, 2019

(54) PARALLEL DIAGNOSTIC/SOFTWARE INSTALLATION SYSTEM

(71) Applicant: Dell Products L.P., Round Rock, TX (US)

(72) Inventors: Brian Dale Schneider, Round Rock, TX (US); Huy Quang Pham, Round Rock, TX (US); Donald L. Harton, Pflugerville, TX (US); Wei Liu, Cedar Park, TX (US); Glen Brian McGonagle, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 3 days.

(21) Appl. No.: 15/419,582

(22) Filed: Jan. 30, 2017

(65) Prior Publication Data

US 2018/0217825 A1 Aug. 2, 2018

(51) Int. Cl.  
*G06F 8/61* (2018.01)

(52) U.S. Cl.  
CPC ...................................... *G06F 8/61* (2013.01)

(58) Field of Classification Search  
None  
See application file for complete search history.

(56) References Cited

U.S. PATENT DOCUMENTS

| | | | | |
|---|---|---|---|---|
| 5,838,948 A * | 11/1998 | Bunza | ............ | G06F 11/261 703/27 |
| 6,425,077 B1 * | 7/2002 | Le | ............ | G01R 31/318516 710/8 |
| 6,543,047 B1 * | 4/2003 | Vrhel, Jr. | ............ | G06F 8/61 714/E11.208 |
| 2002/0091456 A1 * | 7/2002 | O'Connor | ............ | G06Q 10/087 700/97 |
| 2010/0138696 A1 * | 6/2010 | Dehaan | ............ | G06F 11/2294 714/37 |
| 2012/0198438 A1 * | 8/2012 | Auer | ............ | G06F 8/61 717/176 |

(Continued)

OTHER PUBLICATIONS

Kangaroo Notebook—Kangaroo, "World's First Modular Notebook," 2016, pp. 1-5, Kangaroo, http://www.kangaroo.cc/kangaroo-notebook/.

*Primary Examiner* — Daxin Wu  
(74) *Attorney, Agent, or Firm* — Haynes and Boone, LLP

(57) ABSTRACT

A parallel diagnostic/software installation system includes a computing device, a server device storing computing device software, and a software staging device that is coupled to the server device through a first connection that provides a first maximum transmission rate, and that is coupled to the computing device through a second connection that provides a second maximum transmission rate that is faster than the first transmission maximum rate. The software staging device receives a manifest of computing device software for installation on the computing device and then retrieves, from the server device through the first connection, at least a portion of the computing device software while the computing device is performing a diagnostic test on a first hardware configuration of the computing device. The software staging devices determines that the diagnostic test has completed and, in response, provides, to the computing device through the second connection, the computing device software.

20 Claims, 7 Drawing Sheets

(56) References Cited

U.S. PATENT DOCUMENTS

| | | | |
|---|---|---|---|
| 2012/0291022 A1* | 11/2012 | Mehta | G06F 8/60 |
| | | | 717/176 |
| 2015/0331772 A1* | 11/2015 | Tallam | G06F 11/2289 |
| | | | 714/46 |
| 2015/0350311 A1* | 12/2015 | Arai | G06F 8/65 |
| | | | 709/203 |
| 2017/0155564 A1* | 6/2017 | Goldberg | H04L 43/0811 |
| 2017/0257303 A1* | 9/2017 | Boyapalle | H04L 43/14 |
| 2017/0337069 A1* | 11/2017 | Huang | G06F 9/4411 |
| 2017/0344354 A1* | 11/2017 | Schiefelbein | G06F 8/61 |

\* cited by examiner

600

```
┌─────────────────────────────────────┐
│ RECEIVE, OVER A FIRST CONNECTION FROM A │
│ COMPUTING DEVICE, A MANIFEST DESCRIBING │
│ COMPUTING DEVICE SOFTWARE FOR          │
│ INSTALLATION ON THE COMPUTING DEVICE   │
│                 602                    │
└─────────────────────────────────────┘
                    │
                    ▼
┌─────────────────────────────────────┐
│ RETRIEVE, OVER A SECOND CONNECTION     │
│ FROM A SERVER DEVICE, AT LEAST A PORTION│
│ OF THE COMPUTING DEVICE SOFTWARE AT A  │
│ FIRST MAXIMUM TRANSMISSION RATE WHILE A│
│ DIAGNOSTIC TEST IS BEING PERFORMED ON  │
│ THE COMPUTING DEVICE                   │
│                 604                    │
└─────────────────────────────────────┘
                    │
                    ▼
           ◇ IS THE DIAGNOSTIC ◇
           TEST ON THE COMPUTING DEVICE ──── NO
              COMPLETED?                      │
                 606                          │
                    │                         │
                   YES                        │
                    ▼                         │
┌─────────────────────────────────────┐      │
│ PROVIDE, OVER THE FIRST CONNECTION TO │      │
│ THE COMPUTING DEVICE, THE AT LEAST THE│      │
│ PORTION OF THE COMPUTING DEVICE       │      │
│ SOFTWARE AT A SECOND TRANSMISSION RATE│      │
│ THAT IS FASTER THAN THE FIRST         │      │
│ TRANSMISSION RATE                     │      │
│                 608                   │      │
└─────────────────────────────────────┘      │
```

FIG. 6

PARALLEL DIAGNOSTIC/SOFTWARE INSTALLATION SYSTEM

BACKGROUND

The present disclosure relates generally to information handling systems, and more particularly to a parallel diagnostic/software installation system that decreases factory cycle times for information handling systems by providing for the performance of diagnostic testing and network software retrieval for those information handling systems in parallel.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are often customized for the particular needs of particular customers. For example, computing devices such as laptop computing devices, desktop computing devices, server computing devices, and mobile computing devices, may include hardware and software that are provided on the computing device according to a customer's needs and in order to provide desired computing device functionality. The provision of hardware and software on computing devices is associated with a factory cycle in which the hardware for the computing device is configured, and the computing device then performs a series of diagnostic tests to ensure the hardware configuration is operating properly. Following the hardware configuration and diagnostic testing, the computing device then retrieves the software for that computing device through a network according to a software manifest that identifies the particular software for that computing device, and installs that software.

The factory cycle for computing devices is associated with a factory cycle time, and it is desirable for manufacturers to minimize those factory cycles times. However, the current manufacturing techniques discussed above provide for the linear process by the computing device of diagnostic testing, retrieval of the software over the network, and the installation of that software, which can delay the factory cycle time due to, for example, frequent automatic restarts of the computing device required for diagnostic testing and/or other factory cycle bottlenecks known in the art.

Accordingly, it would be desirable to provide an improved diagnostic/software installation system.

SUMMARY

According to one embodiment, an information handling system (IHS) includes a communication system that includes at least one first communication interface that supports a first connection that provides a first maximum transmission rate and at least one second communication interface that supports a second connection that provides a second maximum transmission rate that is faster than the first maximum transmission rate; a processing system coupled to the communication system; and a memory system that is coupled to the processing system and that includes instructions that, when executed by the processing system, cause the processing system to provide a software staging engine that is configured to: receive a manifest of computing device software for installation on a computing device; retrieve, from a server device through the first connection that provides the first maximum transmission rate, at least a portion of the computing device software while the computing device is performing a diagnostic test on a first hardware configuration included in the computing device; and determine that the diagnostic test has completed and, in response, provide, to the computing device through the second connection that provides the second maximum transmission rate, the computing device software.

BRIEF DESCRIPTION OF THE DRAWINGS

FIG. 6 is a flow chart illustrating an embodiment of a method for parallel diagnostic/software installation.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
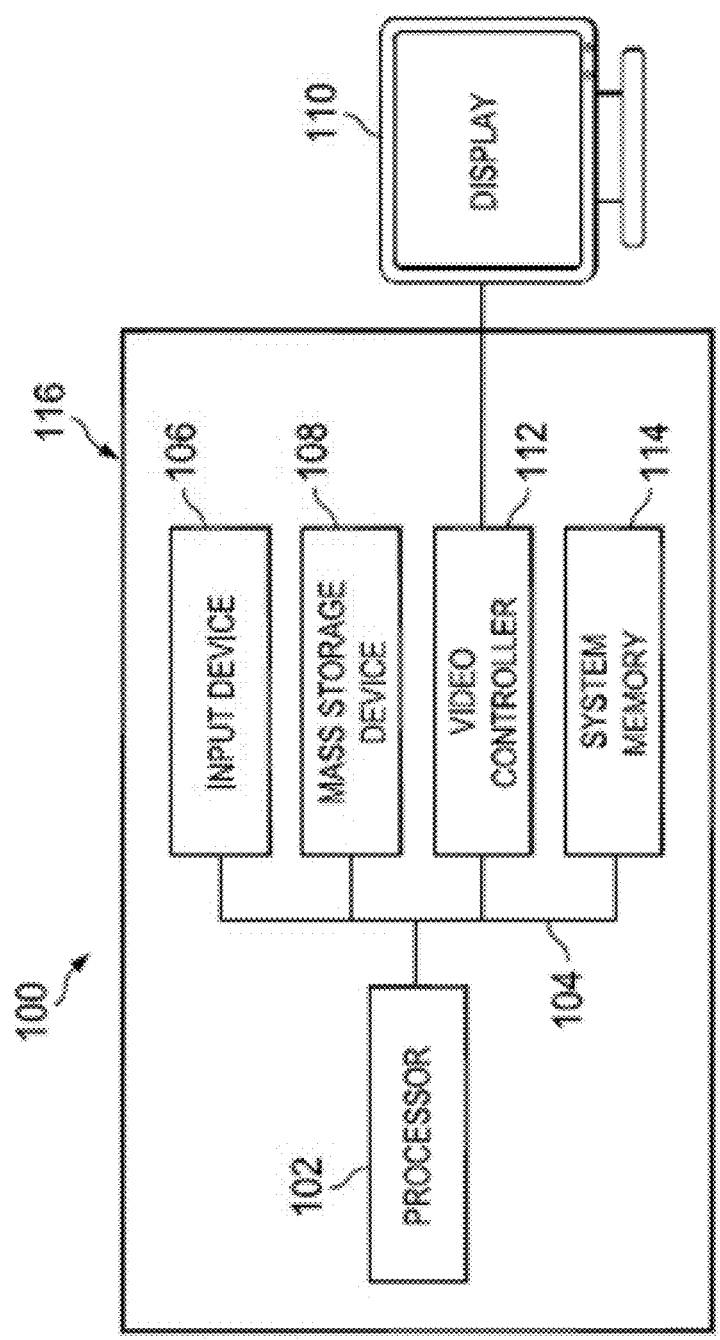
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
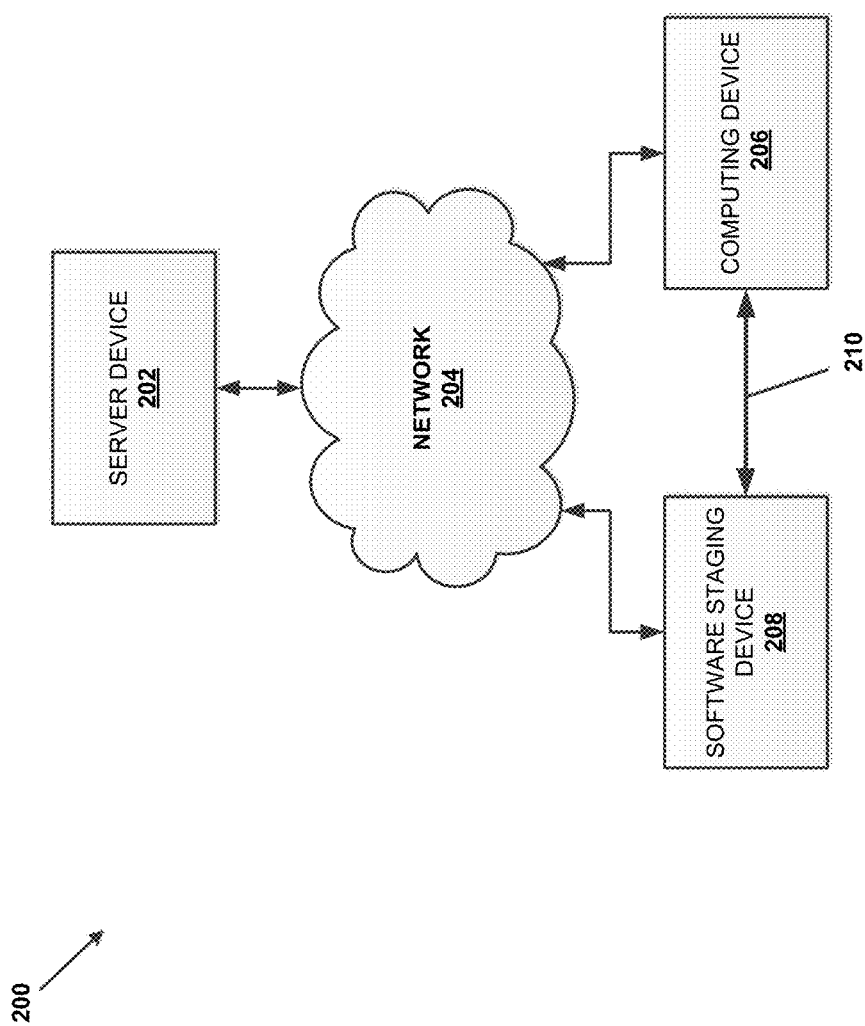
FIG. 2 is a schematic view illustrating an embodiment of a parallel diagnostic/software installation system.

Referring now to FIG. 2, an embodiment of a parallel diagnostic/software installation system 200 is illustrated. In the illustrated embodiment, the parallel diagnostic/software installation system 200 includes a server device 202 that may be the IHS 100 discussed above with reference to FIG. 1, and/or that may include some or all of the components of the IHS 100. For example, the server device 202 may include one or more server devices and/or other computing devices (e.g., desktop computing device(s), laptop/notebook computing device(s), tablet computing device(s), mobile phone(s), etc.) known in the art. As discussed below, the server device 202 may be configured to provide a software repository that stores computing device software and that may provide computing device software to a computing device upon request.

The parallel diagnostic/software installation system 200 also includes a computing device 206 that may be the IHS 100 discussed above with reference to FIG. 1, and/or that may include some or all of the components of the IHS 100. For example, the computing device 206 may include one or more client devices, server devices, and/or other computing devices (e.g., desktop computing device(s), laptop/notebook computing device(s), tablet computing device(s), mobile phone(s), etc.) known in the art. In the illustrated embodiment, the server device 202 is coupled to the computing device 206. For example, the computing device 206 may be coupled to the server device 202 through a network 204 that may be the Internet, a Wide Area Network (WAN), a Local Area Network (LAN), and/or a variety of other networks known in the art. However, in other embodiments, the computing device 206 may not be directly coupled to the network 204, and rather may be coupled to the server device 202 through the software staging device 208 discussed below. In an embodiment, the computing device 206 may be a computing device that is undergoing a manufacturing or other factory process (e.g., a newly ordered computing device that is being built by a computing device manufacturer) to provide a hardware configuration for that computing device 206, perform a diagnostic test on that hardware configuration, and receive installed software on that computing device 206 before the computing device 206 is provided to a customer.

In the illustrated embodiment, both the server device 202 and the computing device 206 are coupled to a software staging device 208 that may be the IHS 100 discussed above with reference to FIG. 1, and/or that may include some or all of the components of the IHS 100. In the embodiments discussed below, the software staging device 208 is provided by a micro Personal Computer (micro PC) or mini Personal Computer (mini PC) that is provides a self-contained computing unit having its own processing system, memory system, storage, network connections and communications ports, as well as running its own operating system and software. In specific embodiments, the software staging device 208 is provided by a Universal Serial Bus (USB) key device (e.g., without input devices such as a keyboard and mouse, or display devices). However, in other embodiments, the software staging device 208 may include one or more computing devices (e.g., desktop computing device(s), laptop/notebook computing device(s), tablet computing device(s), mobile phone(s), miniature computing device(s), dongle device(s) other than the USB key device described herein, etc.) known in the art. In an embodiment, the server device 202 may be coupled to the software staging device 208 through the network 204, while the computing device 206 may be coupled to the software staging device 208 over a direct connection 210, and may optionally be connected to the server device 202 through the network 204. In a specific example, the direct connection 210 between the software staging device 208 and the computing device 206 may be a universal serial bus (USB) connection according to USB specifications (e.g., USB 3.0, USB 3.1, USB 4.0 etc.), an external serial advanced technology attachment (eSATA) connection, a Thunderbolt® connection, a Firewire® connection, a fiber optic connection, as well as other direct data transfer connections that would be apparent to one of skill in the art in possession of the present disclosure. While the software staging device 208 is shown as being configured to have a direct connection 210 with a single computing device 206, the software staging device 208 may have multiple direct connections with the computing device 206, and/or one or more direct connections with additional computing devices simultaneously, and may perform the operations discussed below with those additional computing devices.

Figure 3:
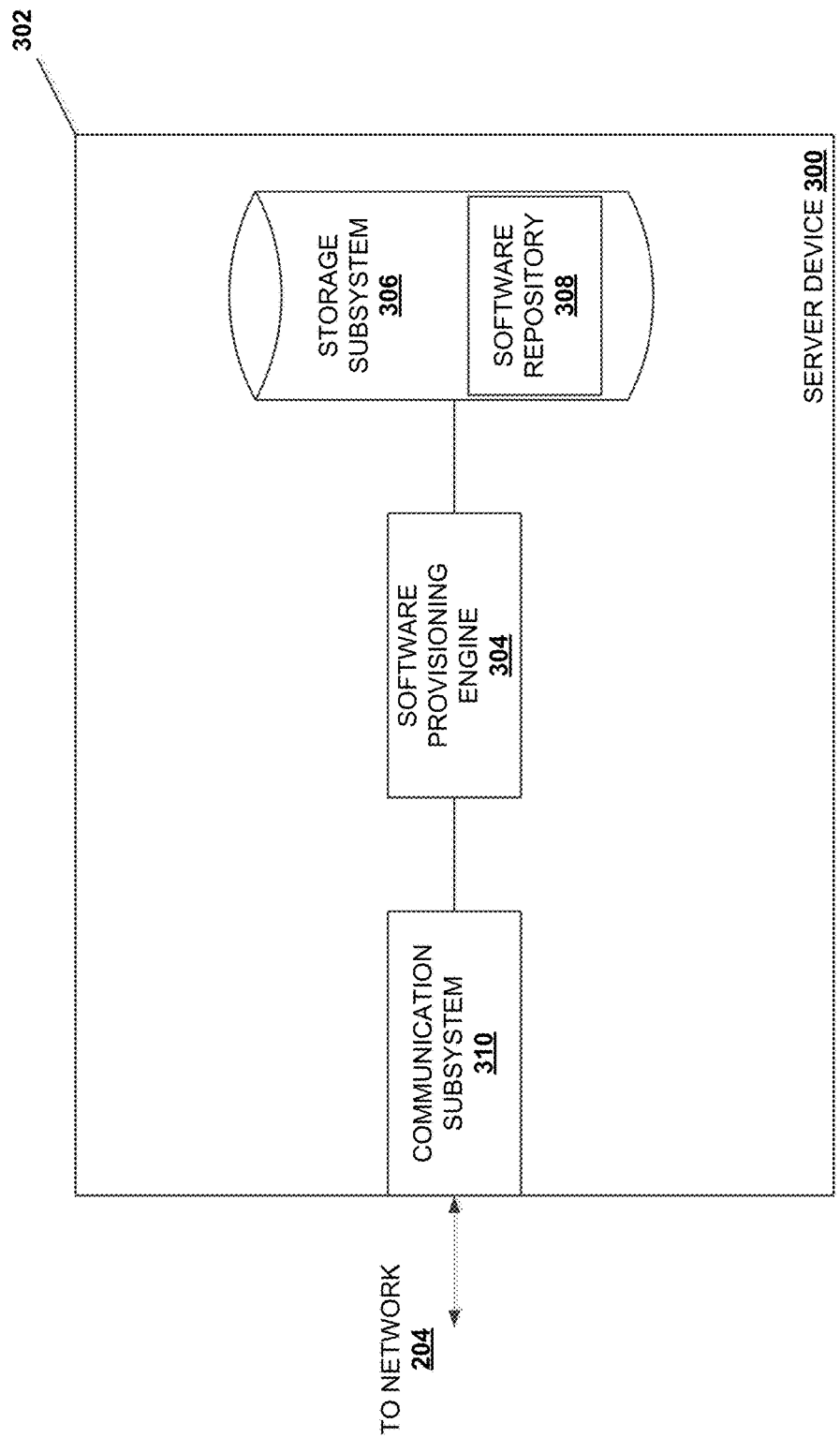
FIG. 3 is a schematic view illustrating an embodiment of a server device used in the parallel diagnostic/software installation system of FIG. 2.

Referring now to FIG. 3, an embodiment of a server device 300 is illustrated that may be the server device 202 discussed above with reference to FIG. 2. As such, the server device 300 may be the IHS 100 discussed above with reference to FIG. 1, and/or may include some or all of the components of the IHS 100. As discussed above, while the server device 300 is described as being a server computing device, the server device 300 may be provided by desktop computing device(s), mobile computing device(s), and/or a variety of other computing device(s) that would be apparent to one of skill in the art in possession of the present disclosure. In the illustrated embodiment, the server device 300 includes a chassis 302 that houses the components of the server device 300, only some of which are illustrated in FIG. 3. For example, the chassis 302 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a software provisioning engine 304 that is configured to perform the functions of the software provisioning engines and server devices discussed below.

The chassis 302 also houses a storage device (not illustrated, but which may include the storage device 108 discussed above with reference to FIG. 1) that is coupled to the software provisioning engine 304 (e.g., via a coupling between the storage device and the processing system) and that includes a storage subsystem 306 that is configured to store the rules and/or other data utilized by the software provisioning engine 304 to provide the functionality discussed below. The storage subsystem 306 includes a software repository 308 that is configured to store computing device software and other data for provisioning computing device software for computing devices as discussed below. The chassis 302 also houses a communication subsystem 310 that is coupled to the software provisioning engine 304 (e.g., via a coupling between the communication subsystem 310 and the processing system), and that may include a network interface controller (NIC), a wireless communication subsystem, and/or other communication subsystems known in the art. The communication subsystem 310 may be configured to communicate through the network 204 of FIG. 2. While specific components of the server device 300 have been illustrated and described, one of skill in the art in possession of the present disclosure will recognize that other components may be included in the chassis 302 and utilized to perform both the functionality described below as well as conventional server device functionality while remaining within the scope of the present disclosure.

Figure 4:
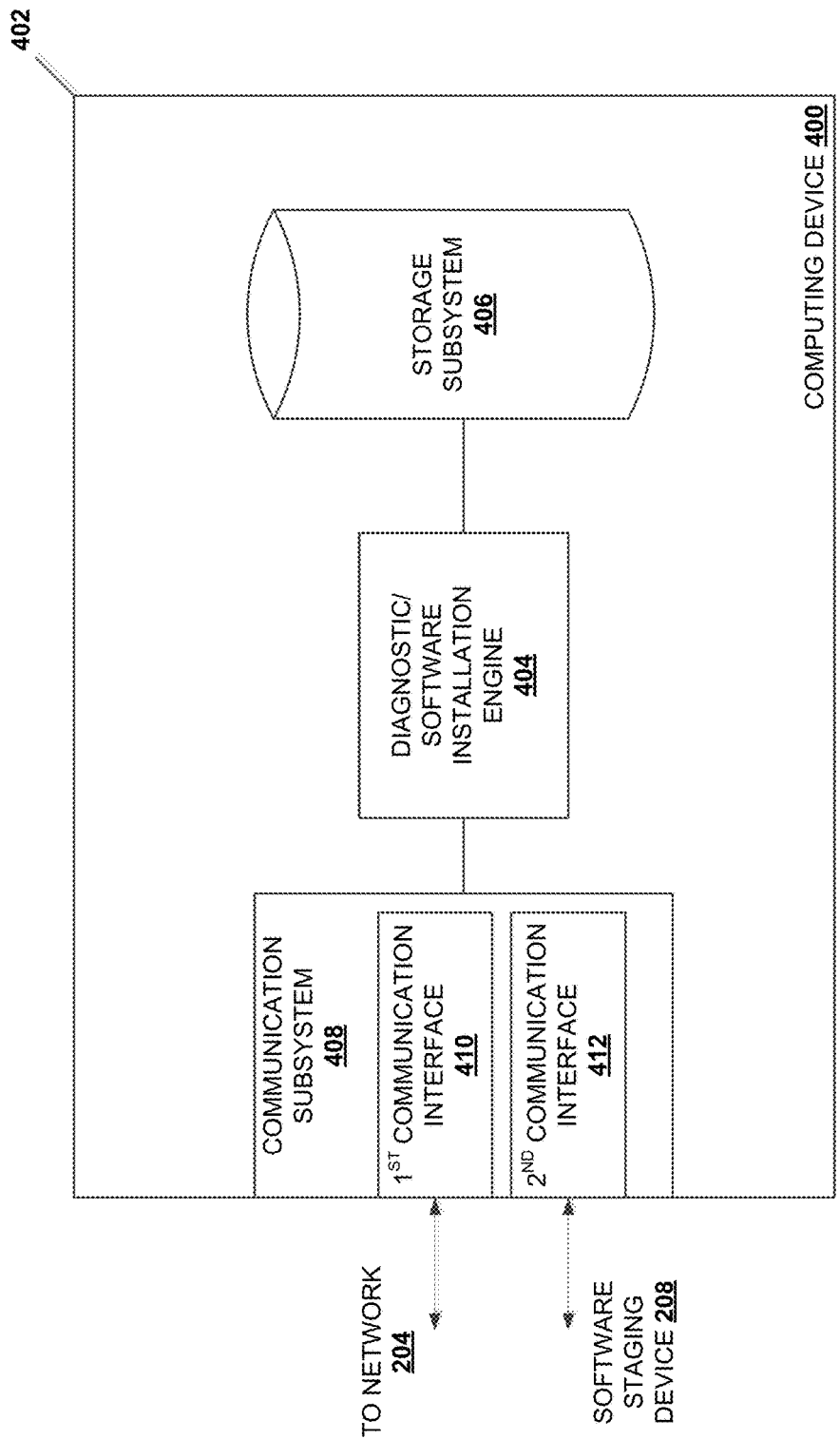
FIG. 4 is a schematic view illustrating an embodiment of a computing device used in the parallel diagnostic/software installation system of FIG. 2.

Referring now to FIG. 4, an embodiment of a computing device 400 is illustrated that may be the computing device 206 discussed above with reference to FIG. 2. As such, the computing device 400 may be the IHS 100 discussed above with reference to FIG. 1, and/or may include some or all of the components of the IHS 100. As discussed above, while the computing device 400 is described as being a computer device, the computing device 400 may be provided by server computing device(s), networking computing device(s), desktop computing device(s), mobile computing device(s), and/or a variety of other computing device(s) that would be apparent to one of skill in the art in possession of the present disclosure. In the illustrated embodiment, the computing device 400 includes a chassis 402 that houses the components of the computing device 400, only some of which are illustrated in FIG. 4. For example, the chassis 402 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a diagnostic/software installation engine 404 that is configured to perform the functions of the diagnostic/software installation engines and computing devices discussed below.

The chassis 402 also houses a storage device (not illustrated, but which may include the storage device 108 discussed above with reference to FIG. 1) that is coupled to the diagnostic/software installation engine 404 (e.g., via a coupling between the storage device and the processing system) and that includes a storage subsystem 406 that is configured to store the rules and/or other data utilized by the diagnostic/software installation engine 404 to provide the functionality discussed below. The chassis 402 also houses a communication subsystem 408 that is coupled to the diagnostic/software installation engine 404 (e.g., via a coupling between the communication subsystem 408 and the processing system), and that may include a network interface controller (NIC), a wireless communication subsystem, and/or other communication subsystems known in the art.

In an embodiment, the communication subsystem 408 may include a first communication interface 410 that supports communications through the network 204 at a first maximum transmission rate. For example, the first communication interface 410 may be a wireless antenna that is configured to provide communications according to IEEE 802.11 protocols (Wi-Fi), cellular 3G, 4G, and/or 5G protocols, and/or other wireless protocols known in the art that are configured to provide wireless communication through the network 204. In other examples, the first communication interface 410 may provide wired communications (e.g., according to the Ethernet protocol) between the computing device 400 and the network 204. As such, the first communication interface may include an Ethernet port configured to receive an Ethernet cable. The communication subsystem 408 may also include a second communication interface 412 that is configured to provide direct communication (e.g., the direction connection 210) with the software staging device 208. For example, the second communication interface 412 may be configured to operate according to wired protocols such as USB 3.0, USB 3.1, and/or other wired protocols that support a second maximum transmission rate that is faster than the first maximum transmission rate of the first communication interface 410. As such, the second communication interface 412 may be a female or male USB port that is configured to receive a USB cable or device that includes a USB connector of the opposite type. In other examples, the second communication interface 412 may be a wireless communication interface that operates according to wireless protocols such as the IEEE 802.11 protocols (Wi-Fi), Bluetooth®, Bluetooth® Low Energy (BLE), near field communication (NFC), infrared data association (IrDA), Zigbee®, Z-Wave®, and/or other wireless communication protocols that allow for direct communication between devices.

While specific communications interfaces have been described as providing the first communication interface 410 and the second communication interface 412, one skilled in the art in possession of the present disclosure will recognize that any of the wired and or wireless communication protocols described for the second communication interface 412 may be implemented on the first communication interface 410, or vice versa, to provide the second communication interface 412 operating according to a communication protocol that supports a second maximum transmission rate that is faster than a first maximum transmission rate supported by the first communication interface 410. Furthermore, while specific components of the computing device 400 have been illustrated and described, one of skill in the art in possession of the present disclosure will recognize that other components may be included in the chassis 402 and utilized to perform both the functionality described below as well as conventional computing device functionality while remaining within the scope of the present disclosure.

Figure 5:
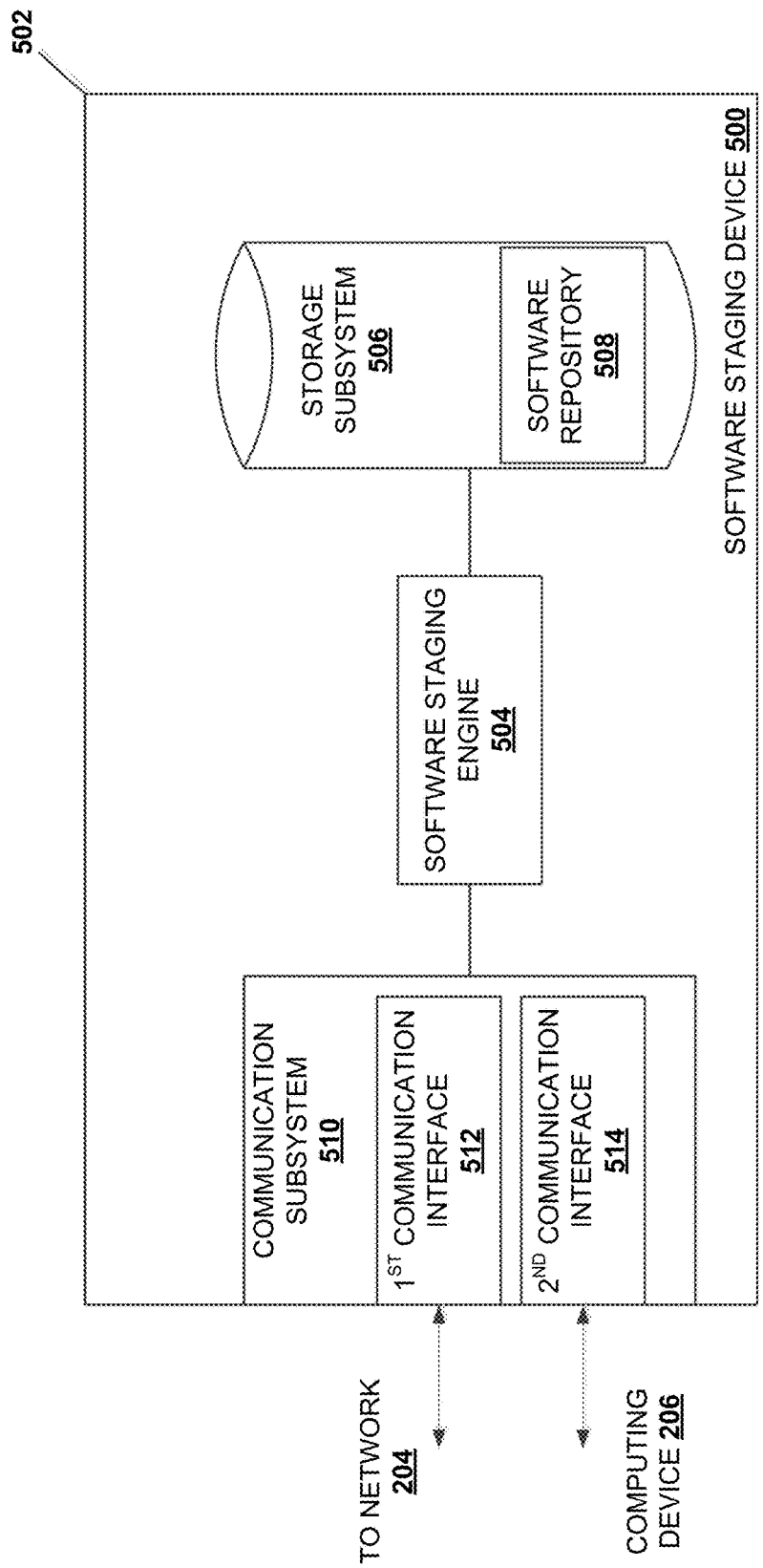
FIG. 5 is a schematic view illustrating an embodiment of a software staging device used in the parallel diagnostic/software installation system of FIG. 2.

Referring now to FIG. 5, an embodiment of a software staging device 500 is illustrated that may be the software staging device 208 discussed above with reference to FIG. 2. As such, the software staging device 500 may be the IHS 100 discussed above with reference to FIG. 1, and/or may include some or all of the components of the IHS 100. As discussed above, while the software staging device 500 is described as being a computing device, the software staging device 500 may be provided by server computing device(s), networking computing device(s), desktop computing device (s), mobile computing device(s), miniature/micro computing device(s), dongle computing device(s), and/or a variety of other software staging device(s) that would be apparent to one of skill in the art in possession of the present disclosure. In the illustrated embodiment, the software staging device 500 includes a chassis 502 that houses the components of the software staging device 500, only some of which are illustrated in FIG. 5. For example, the chassis 502 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a software staging engine 504 that is configured to perform the functions of the software staging engines and software staging devices discussed below.

The chassis 502 also houses a storage device (not illustrated, but which may include the storage device 108 discussed above with reference to FIG. 1) that is coupled to the software staging engine 504 (e.g., via a coupling between the storage device and the processing system) and that includes a storage subsystem 506 that is configured to store the rules and/or other data utilized by the software staging engine 504 to provide the functionality discussed below. The storage subsystem 506 also includes a software repository 508 that is configured to store computing device software and other data for provisioning computing device software on computing devices as discussed below.

The chassis 502 also houses a communication subsystem 510 that is coupled to the software staging engine 504 (e.g., via a coupling between the communication subsystem 510 and the processing system), and that may include a network interface controller (NIC), a wireless communication subsystem, and/or other communication subsystems known in the art. In an embodiment, the communication subsystem 510 may include a first communication interface 512 that supports communications through the network 204 at a first maximum transmission rate. For example, the first communication interface 512 may be a wireless antenna that is configured to provide communications according to IEEE 802.11 protocols (Wi-Fi), cellular 3G, 4G, and/or 5G protocols, and/or other wireless communication protocols known in the art. In other examples, the first communication interface 512 may provide wired communications (e.g., according to the Ethernet protocol) between the software staging device 500 and the network 204. As such, the first communication interface may include an Ethernet port that is configured to receive an Ethernet cable. The communication subsystem 510 may also include a second communication interface 514 that is configured to provide direct communication (e.g., the direction connection 210) with the computing device 206. For example, the second communication interface 514 may be configured to operate according to wired protocols such as USB 3.0, USB 3.1, and/or other wired protocols that support communications at a second maximum transmission rate that is faster than the first maximum transmission rate of the first communication interface 512. As such, the second communication interface 514 may be a female or male USB port configured to receive a cable or device that includes a USB connector of the opposite type.

Thus, the software staging device 500 may be able to directly connect with the computing device 400 by plugging a connector of the second communication interface 514 into a port of the second communication interface 412 of the computing device 400 in order to establish the direct connection 210. However, in other examples, the second communication interface 514 may operate according to wireless communication protocols such as the IEEE 802.11 protocols (Wi-Fi), Bluetooth®, Bluetooth® Low Energy (BLE), near field communication (NFC), infrared data association (IrDA), Zigbee®, Z-Wave®, and/or other wireless communication protocols that allow for direct communication between devices that support a second maximum transmission rate that is faster than the first maximum transmission rate of the first communication interface. While specific communications interfaces are described with respect to the first communication interface 512 and the second communication interface 514, one skilled in the art will recognize that any of the wired and or wireless communication protocols described for the second communication interface 514 may be implemented on the first communication interface 512 (or vice versa) to provide the second communication interface 514 configured to operate according to a communication protocol that supports a second maximum transmission rate that is faster than a first maximum transmission rate supported by the first communication interface 512.

As discussed above, in specific examples the chassis 502 of the software staging device 500 may be configured as a pluggable device (e.g., a dongle device, a mini-PC, a micro-PC, etc.) that houses only the processor 102, the storage device 108, and the system memory 114 of FIG. 1, along with the communication subsystem 510 (e.g., all coupled together by the bus 104.) In some embodiments, the software staging device 500 may not include its own power supply, and any or all of the software staging device components may receive power through the first communication interface 512 using, for example, Power over Ethernet (PoE) methods known in the art, and/or from the second communication interface 514 using, for example, USB powering methods known in the art. Furthermore, while specific components of the software staging device 500 have been illustrated and described, one of skill in the art in possession of the present disclosure will recognize that other components may be included in the chassis 502 and utilized to perform both the functionality described below as well as conventional software staging device functionality while remaining within the scope of the present disclosure.

Referring now to FIG. 6, an embodiment of a method 600 for parallel diagnostic/software installation is illustrated. As discussed below, the systems and methods of the present disclosure provide a parallel diagnostic/software installation system that includes a software staging device that retrieves computing device software for a computing device under manufacture while that computing device performs diagnostic tests on its hardware configuration in parallel. The software staging device may retrieve the computing device software from a server device at a first maximum transmission rate while the computing device performs the diagnostic testing, and provide the computing device software to the computing device at a second maximum transmission rate that is faster than the first maximum transmission rate once the computing device has completed the diagnostic testing.

By using the software staging device to retrieve computing device software for a computing device under manufacture while that computing device performs diagnostic testing on its hardware configuration, the parallel diagnostic/software installation system decreases factory cycle times relative to traditional computing device manufacturing systems in which computing device software retrieval and installation is performed by the computing device after it has completed diagnostic testing.

The method 600 begins at block 602 where a manifest describing computing device software for installation on a computing device is received. In an embodiment, at block 602 the software staging engine 504 in the software staging device 208/500 receives the manifest describing or otherwise identifying computing device software for installation on the computing device 206. For example, the software staging device 208/500 may receive the manifest from the server device 202/300 through the network 204 via the first connection that supports the first maximum transfer rate. In another example, the software staging device may receive the manifest from the computing device 206/400 through the direct connection 210 that supports the second maximum transfer, or through the network 204. As discussed above, the software repository 308 of the server device 202/300 may include computing device software that is available to install on the computing device 206/400. In an embodiment, the manifest may describe or identify computing device software that is to be installed according to a customer's unique order for the computing device 206/400, and that may be included in the computing device software that is stored in the software repository 308. As such, the manifest may include software information such as, for example, identifiers of the software objects, software repository locations, and/or other software information known to one of skill in the art. Furthermore, the manifest may include hardware information, product data, regional customer information (e.g., customer location information, language, time zone, etc.), and/or other hardware and customer information that would be apparent to one of skill in the art in possession of the present disclosure. In different embodiment, the software staging device 208 may receive the manifest prior to the computing device 206 beginning performance of diagnostic testing on its hardware configuration, at any time prior to the completion of that diagnostic testing, and/or at any other time or time period at which the benefits of performing parallel diagnostic testing by the computing device 206 and software retrieval by software staging device 208 are available based on a software provisioning time period required for the software staging device 208 to provide the computing device software to the computing device 206, specific examples of which are discussed in more detail below. The software staging device 208 may then process the manifest to identify computing device software that is stored in the software repository 308 for retrieval from the server device 202/300.

Figure 7:
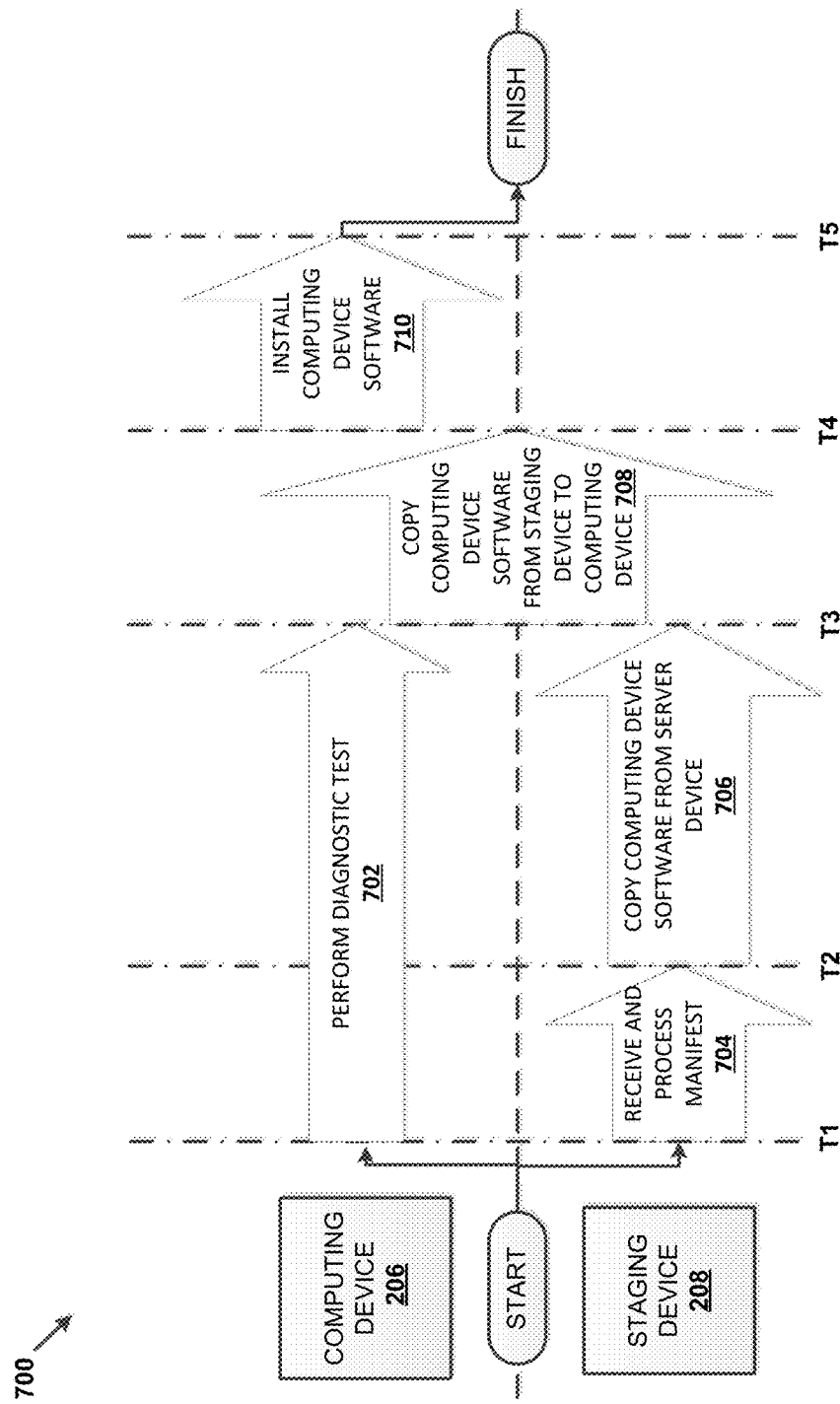
FIG. 7 is a parallel diagnostic/software installation timeline illustrating an embodiment of parallel diagnostic/software installation on the parallel diagnostic/software installation system of FIG. 2.

With reference to FIG. 7, a parallel diagnostic/software installation timeline 700 is illustrated for reference to the discussion of the method 600. FIG. 7 illustrates example work flows performed by the software staging device 208 and the computing device 206 of the parallel diagnostic/software installation system 200 during various time periods associated with the method 600. With reference to block 602 of method 600, at time T1, the software staging device 208 may receive the manifest from the computing device 206 or the server device 202 (not illustrated in FIG. 7) and begin processing the manifest as indicated by arrow 704. As also illustrated in FIG. 7 at time T1, the computing device 206 may begin performing a diagnostic test on its hardware configuration as indicated by arrow 702. While both the receiving and processing of the manifest and the beginning of the diagnostic test are illustrated as occurring at time T1 in the timeline 700, one skilled in the art in possession of the present disclosure will recognize that while the manifest is received by the software staging device 208 at time T1, the diagnostic test may begin prior to time T1 or after time T1 while remaining within the scope of the present disclosure.

The method 600 then proceeds to block 604 where at least a portion of the computing device software is retrieved, from the server device, over the first connection at the first maximum transmission rate while a diagnostic test is being performed on the computing device. In an embodiment at block 604, the software staging device 208 may retrieve, over the first connection and through network 204 at the first maximum transmission rate, the computing device software according to the manifest that was received at block 602 of FIG. 6. For example, the software staging device 208/500 may retrieve, through an Ethernet connection provided by the first communication interface 512, the computing device software from the software repository 308 of server 202/300, and may store the retrieved computing device software in the software repository 508. As discussed above, the Ethernet connection may support a first maximum transmission rate (e.g., 1 gigabytes/second (Gbps)), that may be the maximum transmission rate that the first connection can transfer computing device software, but it should be understood that such a connection may also transfer computing device software at slower speeds during the retrieval process (i.e., communication speeds over the first connection may vary up to the maximum transmission rate.) For example, the software staging device 208 may retrieve at least a portion of the computing device software from the server device 202 while the computing device 206 is performing the diagnostic test. As discussed in further detail below, the time period during which the software staging device 208 is retrieving computing device software from server device 202 while the computing device 206 is performing the diagnostic testing may be performed in parallel such that it provides a reduced diagnostic/software installation time relative to conventional systems that perform the diagnostic test and software retrieval in series.

In an embodiment, the server device 202 may be configured to compress the computing device software to provide compressed computing device software. For example, the server device 202 may compress the computing device software according to various compression techniques known in the art. For example, the server device 202 may compress the computing device software with compression techniques such as ZIP, 7-Zip (7Z), bzip2 (BZ2), GNU Zip (GZ), Tarball (TAR), TGZ (Tarball+GNU Zip), Windows® Imaging Format (WIM), Windows® Cabinet (CAB), Roshal Archive (RAR), International Organization for Standardization (ISO) image, Archived by Robert Jung (ARJ), and/or other compression techniques that would be apparent to one of skill in the art in possession of the present disclosure. The software staging device 208 may then retrieve the compressed computing device software from the server device through the first connection that supports the first maximum transmission rate, and then decompress the compressed computing device software before providing that computing device software to the computing device. In conventional diagnostic/software installation systems that require computing devices to retrieve computing device software from a server device over a network, such compression techniques are not utilized even though they would provide for faster retrieval of the computing device software from the server over the network (i.e., due to smaller file sizes). This is because any time savings would be lost due to the time it takes the computing device to decompress the compressed software. However, one of skill in the art in possession of the present disclosure will recognize how the parallel diagnostic/software installation systems of the present disclosure may benefit from the time savings associated with the data compression discussed above. In an embodiment, the time or time period required by the software staging device 208 to retrieve the computing device software may be less than the time required for the computing device 206 to perform the diagnostic tests and, as such, the software staging device 208 may decompress compressed computing device software in parallel with the diagnostic testing performed by the computing device 206 (i.e., after the software staging device 208 retrieves the compressed computing device software from the server device 202 but before the computing device 206 has completed the diagnostic testing.) Therefore, the software staging device 208 allows for compression techniques that have high compression ratios (e.g., 7Z), and thus long decompression times, to be used to compress the computing device software in a manner that decreases network traffic and overall storage footprint of the computing device software at the server device 300.

With reference to the specific example of parallel diagnostic/software installation illustrated in FIG. 7, the parallel diagnostic/software installation timeline 700 illustrates the work flows performed by the software staging device 208 and the computing device 206 according to block 604 of method 600. With reference to block 604, at time T2, the software staging device 208 may begin retrieving the computing device software from the server device 202 (not illustrated in FIG. 7) as indicated by arrow 706. As also illustrated in FIG. 7, at time T2, the computing device 206 may continue performing the diagnostic test on its hardware configuration as indicated by arrow 702. While the retrieving the computing device software by the software staging device 208 from the server device 202 is illustrated as beginning at time T2 while the diagnostic test is illustrated as beginning at time T1, one skilled in the art in possession of the present disclosure will recognize that the computing device 206 may begin performing the diagnostic testing prior to time T1, at time T2, or after time T2 while still maintaining the benefits identified by the present disclosure.

The method 600 then proceeds to decision block 606 where it is determined whether the diagnostic test on the computing device has been completed. In an embodiment, at block 606 the software staging device 208 monitors the computing device 206 for completion of the diagnostic testing to determine whether the computing device 206 has completed the diagnostic testing on its hardware configuration. In another embodiment, the completion of the diagnostic testing may be a stage in the diagnostic testing that allows for the computing device software to be safely provided from the software staging device 208 to the computing device 206 while the diagnostic testing is still being performed. The software staging device 208/500 may be configured to communicate (e.g., through the network 204 via its first communication interface 512 and/or the direct connection 210 via its second communication interface 514) with the computing device 206 to query the computing device 206/400 (e.g., via its first communication interface 410 and/or second communication interface 412, respectively) to provide an indication of whether it has completed the diagnostic testing. In another example, the software staging device 208/500 may receive an indication from the computing device 206/400 when the diagnostic testing has been completed. In some embodiments, the software staging device 208 may monitor the computing device 206 to determine that the diagnostic testing has completed while the software staging device 208 is retrieving the software from the server device 202 and/or after the software staging device 208 has completed retrieving the software from the server device 202. If the software staging device determines that the computing device 206 has not completed the diagnostic testing at decision block 606, the method may return to block 606 where the software staging device 208 continues to monitor the computing device 206.

If it is determined that the computing device has completed the diagnostic test at block 606, the method 600 proceeds to block 608 where the computing device software is provided to the computing device over the second connection that supports the second maximum transmission rate that is faster that the first maximum transmission rate. In an embodiment, at block 608 the software staging device 208 provides the computing device software, which was retrieved at block 604 from the server device 202, to the computing device 206 after the diagnostic test on the computing device 206 has completed. For example, the software staging device 208/500 may provide, through the direct connection 210 (e.g., a USB 3.1 connection) provided by the second communication interface 514, the software from the software repository 508 to the computing device 206/400 (e.g., through its second communication interface 412). The direct connection 210 may support the second maximum transmission rate, and one skilled in the art will recognize that the second connection may transfer data at slower rates than the maximum transmission rate (i.e., transmissions rates may fluctuate up to the second maximum transmission rate during any given transfer.)

In an embodiment, the second maximum transmission rate is faster than the first maximum transmission rate provided by communications through the network 204. For example, the second connection may be a USB 3.1 connection that supports a maximum transmission rate (e.g., 10 Gbps) that is 10 times faster than a maximum transmission rate supported by a first connection provided by an Ethernet connection (e.g., 1 Gbps) over the network 204. In an embodiment, the software staging device 208 may provide the computing device software to the computing device 206 after the computing device 206 has completed performing the diagnostic testing in order to avoid any potential interference between software retrieval and diagnostic testing on the computing device 206. Additionally, the software staging device 208/500 may provide a portion of the computing device software over the network 204 (e.g., through its first communication interface 512) and to the computing device 206/400 (e.g., through its first communication interface 410) at the first maximum transmission rate in addition to providing another portion of the computing device software over the second connection at the second maximum transmission rate. Thus, using both the network 204 and the direct connection 210 in parallel, the software staging device 208 may provide the computing device software to the computing device 206 at a faster rate than the using the direct connection 210 alone.

One skilled in the art in possession of the present disclosure will recognize that a software retrieval time period, which is the time period required for the software staging device 208 to retrieve the computing device software, may be selected to be performed in parallel with as much of a diagnostic time period, which is the time period required for the computing device 206 to perform the diagnostic testing, as possible such that during the diagnostic time period the software staging device is retrieving the computing device software from the server device 202 and, in some embodiments, decompressing compressed computing device software. For example, if the diagnostic testing by the computing device 206 takes 30 minutes to complete, and the retrieval of software by the software staging device 208 takes 30 minutes at the first maximum transmission rate, then the parallel diagnostic/software installation system may provide increased benefits when the retrieval of the computing device software by the software staging device 208 begins at the same time that the diagnostic testing starts so that both the retrieval of the computing device software and the diagnostic testing finish at the same time.

However, benefits may still be realized over conventional systems that perform the diagnostic testing and software retrieval in series even if only a portion of the software retrieval time period is performed in parallel with the diagnostic time period as long as, for example, the portion of software retrieval time period that occurs in parallel with the diagnostic time period is greater than a software provisioning time period that is required for the software staging device 208 to provide the computing device software to the computing device 206 over the second connection that supports the second maximum transmission rate at 608. For example, if a software provisioning time period is 3 minutes (e.g., assuming a second maximum transfer rate to provide the computing device software from the software staging device 208 to the computing device 206 is 10 times faster than the first maximum transfer rate), then the software retrieval time period for the computing device software from the server device 202 occurring in parallel with the diagnostic testing may be selected to be greater than 3 minutes. This example assumes that the computing device software is provided to the computing device 206 after the complete retrieval of the computing device software from the server device 202. However, in some situations where the diagnostic testing has completed while the retrieval of the computing device software is still being performed, the software staging device 208 may begin providing the computing device software to the computing device 206 in parallel with the retrieval of the remainder of the computing device software from the server device 202. Thus, the minimum time period during which both the software retrieval and the diagnostic testing are being performed in parallel may be reduced further while still providing benefits over conventional systems that perform diagnostic testing and software retrieval in series.

With reference to the specific example of parallel diagnostic/software installation illustrated in FIG. 7, the parallel diagnostic/software installation timeline 700 illustrates the work flows performed by the software staging device 208 and the computing device 206 according to block 606 and 608 of method 600. With reference to block 606, at time T3, the software staging device 208 determines that the diagnostic test being performed on the computing device 206 has completed and the software staging device 208 begins providing the computing device software to the computing device 206 as indicated by arrow 708. At time T4, the software staging device 208 completes the providing of the software to the computing device 206, and the computing device 206 begins installing the software on the computing device 206 as indicated by arrow 710. As illustrated in FIG. 7, the time period between time T2 and time T3 (e.g., the software retrieval time period that the software staging device 208 is retrieving software from the server device 202) is longer than the time period between time T3 and time T4 (e.g., the software provisioning time period that the software staging device 208 is providing the software to the computing device 206.) For example, the time between time T2 and time T3 may be 30 minutes due to the first connection providing computing device software from the server device 202 to the software staging device 208 at a maximum transmission rate of 1 Gbps when then the first connection is an Ethernet connection, while the time between T3 and T4 may be 3 minutes, due to the second connection providing software from the software staging device 208 to the computing device 206 at a maximum transmission rate of 10 Gbps when the second connection is a USB 3.1 connection.

At time T5, the computing device 206 may complete installation of the computing device software that was identified by the software manifest, and the factory cycle of the computing device 206 may be completed. While the installation of the software indicated by arrow 710 is illustrated as beginning at time T4 and after the software staging device 208 has completed providing the software to the computing device 206, the installation of the software on the computing device 206 may be performed in parallel with the provisioning of that software to the computing device 206 by the software staging device 208. Therefore, the software installation on the computing device may begin prior to T4 but subsequent to T3 to further decrease the factory cycle time. While the parallel diagnostic/software installation timeline 700 illustrates a specific example of the timeline for manufacturing a build-to-order computing device in the parallel diagnostic/software installation system of the present disclosure, one of skill in the art in possession of the present disclosure will recognize that other timelines may exist while remaining within the scope of the present disclosure.

In other embodiments, the software staging device 208 may be used to assist in the diagnostic testing being performed on the computing device 206. For example, the software staging device 208 may have a diagnostic storage area (not shown) in the storage subsystem 506 that is segregated from the software repository 508. The diagnostic storage area, as well as use of the direct connection 210 that provides faster communication than the network 204, may allow the software staging device 208 to be used as a first boot device for the computing device 206 to avoid a lengthy network boot. Furthermore, the diagnostic storage area may cache diagnostic content that is normally sent through the network 204 to the server device 202 by the computing device 206. Caching diagnostic content provides faster communication of the cached diagnostic content by using the faster speed of the direct connection 210. In an embodiment, the software staging device 208 may include features of the diagnostic/software installation engine 404 in the computing device 206/400 such that the software staging device 208 serves as a test host for the diagnostic testing. The software staging device 208 may then provide instructions to the computing device 206 to perform operations, provide content, and retrieve results. One of skill in the art in possession of the present disclosure will recognize how moving the diagnostic/software installation engine 404 to the software staging device may provide a much "lighter" and "thinner" diagnostic testing subsystem on the computing device 206.

Thus, systems and methods have been described that provide a parallel diagnostic/software installation system that includes a software staging device that retrieves computing device software that is to be installed on a computing device while that computing device is performing diagnostic testing on its hardware configuration. After the diagnostic test has completed, the software staging device then provides the computing device software to the computing device over a direct connection that supports a faster maximum transmission rate than the maximum transmission rate at which the software staging device and/or the computing device can retrieve the computing device software over a network. As such, the retrieval of computing device software by the software staging device is performed in parallel with the diagnostic testing of a newly manufactured computing device, and that computing device software is then copied to and installed on the computing device as soon as the diagnostic testing is finished. Such systems and methods provides for reduced factory cycle times compared to conventional diagnostic/software installation systems, as such conventional systems require the retrieval of computing device software by the computing device after it has completed the diagnostic test due to the diagnostic testing interfering with the ability of the computing device to reliably retrieve the computing device software.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A parallel diagnostic/software installation system, comprising:
   a computing device that includes a first hardware configuration and that is configured to perform a diagnostic test on the first hardware configuration;
   a server device storing computing device software; and
   a software staging device that is coupled to the server device via a network and through a first connection that provides a first maximum transmission rate, and that is coupled to the computing device through a second connection that is a non-network connection and that provides a second maximum transmission rate that is faster than the first transmission maximum rate, wherein the software staging device is configured to:
      receive a manifest of computing device software for installation on the computing device;
      retrieve, from the server device through the first connection that provides the first maximum transmission rate, at least a portion of the computing device software while the computing device is performing the diagnostic test on the first hardware configuration, wherein the diagnostic test on the first hardware configuration interferes with the computing device to reliably retrieve the software while the diagnostic test is being performed; and
      determine, via monitoring of the diagnostic test performed by the computing device using at least one of the first connection and the second connection, that the diagnostic test has completed and, in response, provide the computing device software to the computing device through the second connection that provides the second maximum transmission rate.

2. The parallel diagnostic/software installation system of claim 1, wherein the computing device is configured to:
   receive, from the software staging device through the second connection that provides the second maximum transmission rate, the computing device software; and
   install the computing device software.

3. The parallel diagnostic/software installation system of claim 1, wherein the computing device includes a computing device chassis that houses the first hardware configuration, and wherein the software staging device includes:
   a software staging device chassis that is separate from the computing device chassis and that houses:
      a communication system having a first communication interface that supports the first connection providing the first maximum transmission rate, and a second communication interface that supports the second connection providing the second maximum transmission rate;
      a processing system that is coupled to the communication system; and
      a memory system that is coupled to the processing system and that includes instruction that, when executed by the processing system, cause the processing system to receive the manifest, retrieve the at least the portion of the computing device software, determine that the diagnostic test has completed, and provide the computing device software to the computing device.

4. The parallel diagnostic/software installation system of claim 3, wherein the first communication interface is an Ethernet port and the second communication interface is a universal serial bus (USB) port.

5. The parallel diagnostic/software installation system of claim 1, wherein the software staging device is coupled to the computing device through a third connection that provides the first maximum transmission rate, and wherein the software staging device is configured to provide the computing device software to the computing device through the second connection that provides the second maximum transmission rate and through the third connection that provides the first maximum transmission rate.

6. The parallel diagnostic/software installation system of claim 1,
   wherein the server device is configured to compress the computing device software to provide compressed computing device software, and wherein the software staging device is configured to:
   retrieve, from the server device through the first connection that provides the first maximum transmission rate, the compressed computing device software; and
   decompress the compressed computing device software before providing the computing device software to the computing device.

7. The parallel diagnostic/software installation system of claim 1, wherein a software retrieval time period, which is associated with the retrieving the at least the portion of the computing device software from the server device through the first connection that provides the first maximum transmission rate while the computing device is performing the diagnostic test on the first hardware configuration, is greater than a software provisioning time period, which is associated with providing the computing device software to the computing device over the second connection that provides the second maximum transmission rate.

8. An information handling system (IHS), comprising:
   a communication system that includes at least one first communication interface that supports a first network connection that provides a first maximum transmission rate and at least one second communication interface that supports a second non-network connection that provides a second maximum transmission rate that is faster than the first maximum transmission rate;

a hardware processor coupled to the communication system; and a non-transitory memory that is coupled to the hardware processor and that includes instructions that, when executed by the hardware processor, cause the hardware processor to provide a software staging engine that is configured to:

receive a manifest of computing device software for installation on a computing device;

retrieve, from a server device through the first connection that provides the first maximum transmission rate, at least a portion of the computing device software while the computing device is performing a diagnostic test on a first hardware configuration included in the computing device, wherein the diagnostic test on the first hardware configuration interferes with the computing device to reliably retrieve the software while the diagnostic test is being performed; and determine, via monitoring of the diagnostic test performed by the computing device using at least one of the first connection and the second connection, that the diagnostic test has completed and, in response, provide the computing device software to the computing device through the second connection that provides the second maximum transmission rate.

9. The IHS of claim 8, wherein the computing device is configured to:

receive, from the software staging engine through the second connection that provides the second maximum transmission rate, the computing device software; and install the computing device software.

10. The IHS of claim 8, wherein the first communication interface is an Ethernet port and the second communication interface is a universal serial bus (USB) port.

11. The IHS of claim 8, wherein the first communication interface supports a third connection that provides the first maximum transmission rate, and wherein the software staging engine is configured to:

provide the computing device software to the computing device through the second connection that provides the second maximum transmission rate and through the third connection that provides the first maximum transmission rate.

12. The IHS of claim 8, wherein the server device is configured to compress the computing device software to provide compressed computing device software, and wherein the software staging engine is configured to:

retrieve, from the server device through the first connection that provides the first maximum transmission rate, the compressed computing device software; and decompress the compressed computing device software before providing the computing device software to the computing device.

13. The IHS of claim 8, wherein a software retrieval time period, which is associated with the retrieving the at least the portion of the computing device software from the server device through the first connection that provides the first maximum transmission rate while the computing device is performing the diagnostic test on the first hardware configuration, is greater than a software provisioning time period, which is associated with providing the computing device software to the computing device over the second connection that provides the second maximum transmission rate.

14. A method for parallel diagnostic/software installation, comprising:

receiving, by a software staging device, a manifest of computing device software for installation on a computing device;

retrieving, by the software staging device from a server device via a network through a first connection that provides a first maximum transmission rate, at least a portion of the computing device software while the computing device is performing a diagnostic test on a first hardware configuration included in the computing device, wherein the diagnostic test on the first hardware configuration interferes with the computing device to reliably retrieve the software while the diagnostic test is being performed; and determining, by the software staging device via monitoring of the diagnostic test performed by the computing device using at least one of the first connection and a second connection that is a non-network connection and that provides a second maximum transmission rate that is faster than the first maximum transmission rate, that the diagnostic test has completed and, in response, providing the computing device software to the computing device through the second connection.

15. The method of claim 14, further comprising:

receiving, by the computing device from the software staging device through the second connection that provides the second maximum transmission rate, the computing device software; and installing, by the computing device, the computing device software.

16. The method of claim 14, wherein the computing device includes a computing device chassis that houses the first hardware configuration, and wherein the software staging device includes:

a software staging device chassis that is separate from the computing device chassis and that houses:

a communication system having a first communication interface that supports the first connection providing the first maximum transmission rate, and a second communication interface that supports the second connection providing the second maximum transmission rate;

a processing system that is coupled to the communication system; and a memory system that is coupled to the processing system and that includes instruction that, when executed by the processing system, cause the processing system to perform operations of receiving the manifest, retrieving the at least the portion of the computing device software, determining that the diagnostic test has completed, and providing the computing device software to the computing device.

17. The method of claim 16, wherein the first communication interface is an Ethernet port and the second communication interface is a universal serial bus (USB) port.

18. The method of claim 14, wherein the software staging device is coupled to the computing device through a third connection that provides the first maximum transmission rate, and wherein the software staging device is configured to provide the computing device software to the computing device through the second connection that provides the second maximum transmission rate and through the third connection that provides the first maximum transmission rate.

19. The method of claim 14, wherein the server device is configured to compress the computing device software to provide compressed computing device software, and the method further comprises:

retrieving, by the software staging device from the server device through the first connection that provides the first maximum transmission rate, the compressed computing device software; and decompressing, by the software staging device, the compressed computing device software before providing the computing device software to the computing device.

20. The method of claim 14, wherein a software retrieval time period, which is associated with the retrieving, by the software staging device from the server device through the first connection that provides the first maximum transmission rate, the at least the portion of the computing device software while the computing device is performing the diagnostic test on a first hardware configuration included in the computing device, is greater than a software provisioning time period, which is associated with the providing, to the computing device through a second connection that provides a second maximum transmission rate that is faster than the first maximum transmission rate, the computing device software.

* * * * *